Jan. 18, 1955
T. T. TAYLOR
2,700,106
AIRCRAFT ANTENNA STABILIZATION SYSTEM
Filed Feb. 24, 1951
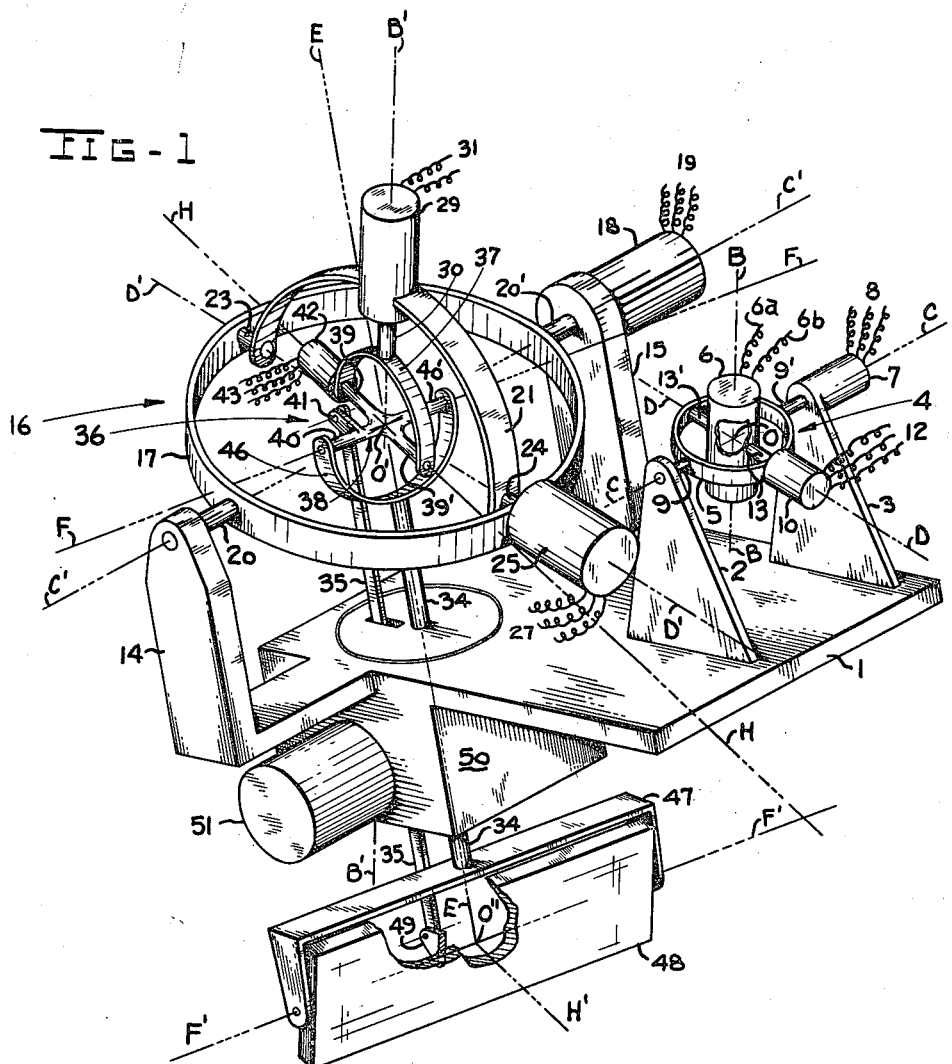
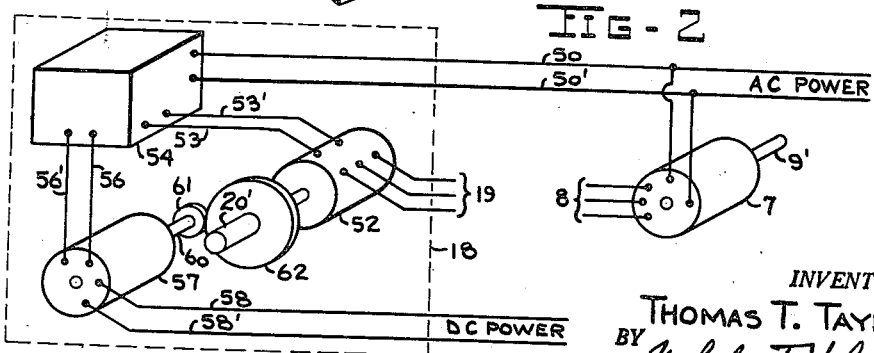
INVENTOR.
THOMAS T. TAYLOR
BY Nicholas T Vohn
atty.

United States Patent Office 2,700,106
Patented Jan. 18, 1955

2,700,106

AIRCRAFT ANTENNA STABILIZATION SYSTEM

Thomas T. Taylor, Santa Monica, Calif., assignor, by mesne assignments, to Hughes Aircraft Company, a corporation of Delaware Application February 24, 1951, Serial No. 212,610

8 Claims. (Cl. 250—33.65)

This invention relates to a line-of-sight stabilization of an aircraft bombing antenna system in which the azimuth of the line-of-sight and the "cross-level" angle of the antenna are obtained simultaneously by a simple electro-mechanical system.

The two basic types of stabilization employed in aircraft bombing antenna systems are the platform stabilization and the line-of-sight stabilization. The entire antenna in the platform stabilization system is rotated only in azimuth about an axis maintained at true vertical with respect to earth by servo systems. The term "platform stabilization" is hence derived from the necessity of maintaining the mounting base of the antenna, i. e., the platform, in a constant true level position regardless of the fluctuations of the aircraft's position in flight, so that the antenna thereon may be revolved about a true vertical axis. The maintenance of such a platform in a constant level position relative to the earth's surface requires at least two servo systems continually operable to adjust two spaced points on the platform relative to each other and to a third fixed pivot point attaching the platform to the aircraft. Only a single deflection voltage, either a ground range sweep or a linear sweep, need be applied to the spot on the display tube associated with the bombing system in the platform stabilization system.

In the line-of-sight stabilization, the antenna is rotated in azimuth about a primary axis fixed in the aircraft, and in elevation about a secondary axis in such a manner as to maintain a horizontal line-of-sight. The line-of-sight is defined as that line in the antenna frame of reference which is horizontal when the antenna pattern is in proper relationship to ground. This line-of-sight is an imaginary line as determined by operational characteristics of the particular antenna utilized, and the term is applicable to all types of antennas suitable for installation in an aircraft bombing system.

Line-of-sight stabilization systems are of simpler construction, lighter weight, and smaller size than are the platform stabilization systems. These advantages of line-of-sight stabilization systems, although important, have been minimized in the past due to additional equipment needed to interpret the data furnished by them.

In line-of-sight stabilization, two deflection voltages, the ground range sweep and the cross-level deflection are required for presentation of the bombing information on the display tube. The ground range sweep in the display tube must take place along the line whose azimuth corresponds to the azimuth of the line-of-sight, but this is not equivalent to the angular displacement of the antenna system measured about its primary axis since the primary axis, i. e., the vertical axis of the aircraft, is not always true vertical. In prior line-of-sight stabilization systems, the azimuth of the line-of-sight was obtained by an auxiliary computer device from the angular displacement of the antenna system about its primary axis and the pitch and roll of the aircraft. The cross-level angle, from which the cross-level deflection voltage is obtained, is defined as the deviation of the pattern plane of the antenna from the true vertical. This pattern plane contains the antenna's primary axis and the line-of-sight, and is, therefore, the plane containing the essential radiation from the antenna. In prior systems, this cross-level angle also had to be calculated by a computer system from information contained in the apparent azimuth measured about the antenna's primary axis and the pitch and roll of the aircraft.

The use of electronic computer systems to calculate the azimuth of the line-of-sight and the cross-level angle added considerably to the complexity of the prior line-of-sight stabilization systems with the resultant decrease in reliability and accuracy of the overall system.

It is, therefore, a principal object of this invention to provide a line-of-sight stabilization antenna bombing system in which the azimuth of the line-of-sight and the cross-level angle are measured by a simple electro-mechanical system.

Another object of this invention is to provide a line-of-sight stabilization antenna bombing system in which the azimuth of the line-of-sight is measured from the angular position of a shaft which is maintained in a true vertical position at all times and which is rotatably driven by the antenna drive system.

Another object of this invention is to provide a line-of-sight stabilization antenna bombing system in which the cross-level angle is measured by the rotation of a shaft section maintained in true horizontal position with respect to earth at all times, with the shaft section forming a portion of a coupling between a shaft maintained in true vertical position and the antenna drive system.

Still another object of this invention is to provide a line-of-sight stabilization antenna bombing system in which the azimuth of the line-of-sight and the cross-level angle are measured across the two intersecting axes, respectively, of a universal joint coupling a shaft maintained at true vertical position with respect to earth and an antenna drive system.

Another object of this invention is to provide a simple and reliable means for maintaining the line-of-sight of an aircraft antenna at true horizontal at all times during its rotation, regardless of the pitch and roll of the aircraft.

The novel features which are believed to be characteristic of the invention, both as to its organization and method of operation, together with further objects and advantages thereof, will be better understood from the following description considered in connection with the accompanying drawings in which the invention is illustrated by way of example. It is to be expressly understood, however, that the drawings are for the purpose of illustration and description only, and are not intended as a definition of the limits of the invention.

Fig. 1 is a schematic representation of the invention;

Fig. 2 is a block schematic diagram of selsyn and servo units associated with Fig. 1.

In Fig. 1, gimbals 4 comprise supports 2 and 3 which are secured to a platform 1 rigidly fixed to the aircraft frame (not shown). Ring 5 is rotatably mounted between the supports 2 and 3 on a pair of trunnions 9, 9' which lie on an axis OC parallel to, or in alignment with, the fore-aft axis of the aircraft. A vertical gyro 6 having a vertical axis OB is rotatably mounted within ring 5 on another pair of trunnions 13, 13' having an axis OD. The vertical axis OB of gyro 6 is continuously maintained in true vertical by the action of gyro 6 within the two degrees of freedom afforded it by the axis OC and OD of the two pairs of trunnions 9, 9' and 13, 13', respectively, within the gimbals 4. Electrical signals relative to the maintenance of axis OB in the true vertical are produced by selsyns 7 and 10. The stator of selsyn 7 is secured to support 3 and its rotor shaft is integral with trunnion 9' to rotate therewith around axis OC. Selsyn 7 thus produces voltages on its output conductors 8 as determined by the angular position of ring 5. The stator of selsyn 10 is mounted on ring 5 and its rotor shaft is integral with trunnion 13 to revolve with gyro 6 around the axis OD. Selsyn 10 hence produces voltages on its output conductors 12, in accordance with the rotational position of gyro 6 around axis OD.

Gimbals 16 contain two supports 14, 15 secured to platform 1 along an axis O'C' parallel to axis OC. The ring 17 of gimbals 16 is mounted between a pair of trunnions 20, 20' on supports 14 and 15 and lying on the axis O'C'. Ring 17 is rotatably driven around the axis O'C' by the selsyn rotor shaft integral with trunnion 20' of servomotor and selsyn unit 18 secured to support 15. The input conductors 19 of servomotor and selsyn unit 18 are electrically connected to the output conductors 8 of selsyn 7 and its shaft, integral with trunnion 20', maintains ring 17 in the same rotatable position relative to platform 1 as ring 5 is maintained relative to the same platform. Yoke 21 of gimbals 16 is rotatably mounted to ring 17 by trunnions 23, 24 lying along an axis O'D'. One end of the yoke 21 is pivotedly mounted by trunnion 23 to ring 17 while the other end of yoke 21 is secured to a trunnion 24 integral with the selsyn rotor shaft of servomotor and selsyn unit 25 secured to ring 17. The angular position of trunnion 24 relative to ring 17 is maintained at the same angular position as the trunnion 13 relative to ring 5, since output conductors 12 of the selsyn 10 are connected to the input conductors 27 of servomotor and selsyn unit 25. An azimuth selsyn 29 having a shaft 30 is centrally secured to yoke 21. Shaft 30, of azimuth selsyn 29 lying along axis O'B', is hence maintained in the true vertical position of axis OB of vertical gyro 6 by units 18, 25 which reproduce the angular positions of selsyns 7, 10, respectively. The details of operation of selsyn generators 7 and 10 and their associated servomotor and selsyn units 18 and 25, respectively, are described and shown in more detail in Fig. 2.

Shaft 30 is coupled to a primary antenna shaft 34 through a universal joint 36. Universal joint 36 contains a yoke 37 integral with shaft 30 pivotedly mounted and enclosing trunnions 39, 39' having an axis O'H. The axis O'H of trunnions 39, 39' is thus maintained at a true horizontal since shaft 30 is maintained in true vertical. The stator of selsyn 42 is rigidly secured to yoke 37 while its rotor shaft is secured to trunnion 39 and is rotatable therewith about the axis O'H. The output voltage from selsyn 42 appears on output conductors 43, and this output voltage is a measure of the "cross-level" angle. Universal joint 36 further contains a yoke 46, integral with the primary antenna shaft 34, which encloses and is pivotedly mounted to a pair of trunnions 40, 40' having an axis O'F. The axis of O'F of the trunnions 40, 40' intersects the axis O'H of trunnions 39, 39' at right angles and forms the cross 38.

The other end of the primary antenna shaft 34 is secured to a yoke 47 to which the antenna 48 is rotatably mounted along axis O''F'. A link 35 is connected between a crank arm 41 integral with trunnion 40 of cross 38 and another crank arm 49 integral with antenna 48. Crank arms 41 and 49 are parallel to the trunnions 39, 39' lying along axis O'H and, upon proper adjustment of link 35, maintain the line-of-sight O''H' of antenna 48 parallel to axis O'H which is, in turn, true horizontal. This line-of-sight, as previously defined, is that imaginary line in the antenna frame of reference which is horizontal when the antenna pattern is in proper relationship to ground. This horizontal line-of-sight of antenna 48 is maintained regardless of rotary movements given antenna 48 or of variations of the aircraft's position from level flight. Antenna 48 must also be mounted to shaft 34 and link 35 such that its longitudinal axis O''F' is parallel to axis O'F of the trunnions 40, 40'.

Antenna 48 may be given either continuous rotary motion or backward and forward motion to produce "sector scan." Either of these motions may be applied to the antenna through its primary shaft 34 by a motor 51 through a gear box 50. Both motor and gear box are secured to platform 1 and maintain the axis O'O'' of the antenna shaft 34 at the plane's vertical at all times. Link 35 shares the rotary motion of shaft 34 and is revolved about the axis O'O'' of shaft 34.

In operation, vertical gyro 6 is supplied energy through its conductors 6a and 6b and assumes a true vertical position with respect to earth. This true vertical position is indicated by electrical output signals of selsyns 7 and 10, respectively, whose shafts are secured to the two pivot points of gimbal 4. This true vertical position of gyro 6 is then assumed by selsyn shaft 30 affixed to yoke 21 by action of the servomotor and selsyn units 18, 25 electrically connected to the servos 7, 10, respectively. The shaft 30 is rotated in azimuth through universal joint 36 by the rotation of primary antenna shaft 34 and the relative azimuth of axis O'H is measured about the true vertical axis O'B' by the selsyn 29. The output of selsyn 29 appears on its output conductors 31. But since the line-of-sight is parallel to O'H, selsyn 29 gives an indication of the relative azimuth of the line-of-sight. This azimuth is subsequently utilized by the display tube constituting a portion of the bombing system.

The pattern plane previously defined as containing the antenna's primary axis and line-of-sight may be identified in Fig. 1 as the plane containing the axis O'O'', O''H', and O'H. Axis O'F is normal to this pattern plane and the angular displacement of axis O'F measured about the horizontal axis O'H is a measure of the cross-level angle. This cross-level angle has been previously defined as the deviation of the pattern plane of the antenna from the true vertical, and this displacement is measured by selsyn indicator 42. This cross level angle is also utilized by the display tube associated with the bombing system.

A cross-level angle indication produced as shown by selsyn indicator 42 is a voltage proportional to the angular displacement of trunnions 39, 39', about enclosing yoke 37. Other well known systems may obviously be utilized to convert such an angular displacement into a proportional voltage. For example, a potentiometer might be secured to yoke 37 with its movable arm secured to trunnion 39. Any voltage applied across the potentiometer would be tapped off by the movable arm proportionate to its angular displacement.

Fig. 2 discloses the mode of operation of the servomotor and selsyn unit 18 in conjunction with the selsyn generator 7. The mode of operation to be described between these two particular units is equally applicable to selsyn generator 10 and servomotor and selsyn unit 25. Trunnion 9' is integral with the rotor of selsyn generator 7 and rotates the rotor in accordance with the axial rotation of ring 5 about the axis OC. Power from an A. C. source (not shown) is delivered to the rotor of selsyn generator 7 by conductors 50, 50' and the stator output conductors 8 of selsyn generator 7 are connected to the stator input conductors 19, of selsyn control transformer 52, within servomotor and selsyn unit 18. Any angular shaft difference between trunnion 9' and 20' is reflected immediately as an error signal on the rotor output conductors 53, 53' of selsyn control transformer 52. This error signal is applied to servo amplifier 54, as is A. C. power through conductors 50, 50'. The output of servo amplifier 54, which consists of the error signal after amplification and phase-sensitive rectification, is fed to the armature of servomotor 57 by means of conductors 56, 56'. Power from a D. C. source (not shown) is applied through conductors 58, 58' to the motor field of servomotor 57 and, with the signal on conductors 56, 56', produce a rotation of the output shaft 60 of servomotor 57. A gear 61, mounted on this output shaft 60, meshes with a gear 62 mounted on trunnion 20', which is also integral with the rotor of selsyn control transformer 52. Thus, any angular rotational difference between trunnions 9' and 20' is reflected as an error signal by selsyn control transformer 52 which, after amplification, serves to energize servomotor 57 which, in turn, through its output shaft, rotates trunnion 20' until angular alignment between trunnion 20' and 9' once more exists. Trunnion 9' receives a low torque input from ring 5, while trunnion 20' produces a high torque output on ring 17.

The result of interaction between selsyn generator 7 and 10 and the servomotor and selsyn units 18 and 25, respectively, are identical and maintain the axes O'B' of selsyn indicator 27 in the identical true vertical position obtained by vertical gyro 6. It is apparent that numerous other systems may be utilized to maintain this true vertical position of the axis O'B'. However, this system, as shown, provides one of the more reliable methods in addition to being well-known and conventional in the art.

What is claimed as new is:

1. In a line-of-sight stabilization antenna system for aircraft producing signals representing the azimuth of the line-of-sight and the cross-level angle, respectively, the combination comprising: a universal joint having first and second pairs of trunnions; an antenna having an antenna shaft, means coupling said antenna shaft to said first pair of trunnions; means for mounting said antenna shaft along the aircraft vertical; means for rotating said antenna shaft; a second shaft, means for maintaining said second shaft in true vertical with respect to earth; means for coupling said second shaft to the second pair of trunnions of said universal joint to maintain the axis of said second pair of trunnions at true horizontal during the rotation of said antenna, first signal producing means coupled to said second shaft for producing a signal indicative of the azimuth of the line-of-sight of said antenna; and second signal producing means coupled to one of the second pair of trunnions of said universal joint for measuring the rotation thereof about the axis of said second pair of trunnions to produce a signal indicative of the cross-level angle of said antenna.

2. The combination described in claim 1, and means coupled between one of said first pair of trunnions and said antenna, for maintaining the line-of-sight of said antenna parallel to the axis of said second pair of trunnions during the rotation thereof.

3. The combination described in claim 2 wherein said means for maintaining said second shaft in the true vertical comprises: first gimbals mounted on the aircraft and having first and second pairs of trunnions, first and second selsyns having their rotors coupled to one of said first pair of trunnions and one of said second pair of trunnions, respectively, and rotatable thereby; a vertical gyro pivotally mounted on said second pair of trunnions, said gyro, upon energization, maintaining itself upon said first gimbals in true vertical with respect to earth; second gimbals mounted on the aircraft and having first and second pairs of trunnions; first and second servo and selsyn units mechanically coupled to one of said first pair of trunnions and one of said second pair of trunnions, respectively; means conductively connected between the first and second selsyns to the first and second servos and selsyn units, respectively, for positioning said second gimbals similarly to said first gimbals; and means coupled between the second shaft and one of the second pair of trunnions of said second gimbals for maintaining said second shaft at true vertical with respect to earth.

4. In a line-of-sight stabilization antenna system for aircraft indicating the azimuth of the line-of-sight, the combination comprising: a shaft, means for maintaining said shaft in true vertical with respect to earth; an antenna; a universal joint; means coupling said universal joint between said shaft and said antenna; and signal producing means coupled to said shaft for producing an indication of the azimuth of the line-of-sight of said antenna.

5. In a line-of-sight stabilization antenna system for aircraft indicating the cross-level angle, the combination comprising: an antenna; a universal joint having two axes; means coupled to said universal joint for maintaining one axis of said universal joint at true horizontal with respect to earth; means coupling said universal joint to said antenna; and a signal producing means coupled to said universal joint to measure the angular displacement of said universal joint about its horizontally maintained axis, said angular displacement being the cross-level angle of said antenna system.

6. In a line-of-sight stabilization antenna system for aircraft indicating the azimuth of the line-of-sight and the cross-level angle, respectively, the combination comprising: a shaft, means for maintaining said shaft in true vertical with respect to earth; an antenna; a universal joint having two axes; means coupling said universal joint between said antenna and said shaft whereby one of the axes of said universal joint is maintained at true horizontal with respect to earth; first signal producing means coupled to said shaft for producing signals indicative of the azimuth of the line-of-sight of the system; and a second signal producing means coupled to said universal joint to produce signals indicative of the angular displacement of said universal joint about its horizontally maintained axis, said angular displacement being the cross-level angle of said antenna.

7. In a line-of-sight stabilization antenna system for aircraft indicating the azimuth of the line-of-sight, the combination comprising: a shaft, means maintaining said shaft in true vertical with respect to earth; antenna means; flexible coupling means coupled between said shaft and said antenna means; and indicating means coupled to said shaft for producing an indication of the azimuth of the line-of-sight of said antenna means.

8. The combination according to claim 7 having, additional signal producing means coupled to said flexible coupling means to provide an indication of the cross-level angle of said antenna means.

References Cited in the file of this patent

UNITED STATES PATENTS

| | | |
|---|---|---|
| 2,415,679 | Edwards et al. | Feb. 11, 1947 |
| 2,425,737 | Hanna et al. | Aug. 19, 1947 |
| 2,472,824 | Hays | June 14, 1949 |
| 2,551,180 | Starr et al. | May 1, 1951 |